(12) United States Patent  (10) Patent No.: US 8,469,304 B2
Feldstein et al.  (45) Date of Patent: *Jun. 25, 2013

(54) SYSTEM FOR STORING MULTIPLE CABLE RETRACTORS

(75) Inventors: George Feldstein, Cresskill, NJ (US); Michael Campagna, Woodcliff Lake, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/209,481

(22) Filed: Aug. 15, 2011

(65) Prior Publication Data

US 2012/0175450 A1   Jul. 12, 2012

Related U.S. Application Data

(63) Continuation-in-part of application No. 13/115,454, filed on May 25, 2011.

(60) Provisional application No. 61/430,606, filed on Jan. 7, 2011.

(51) Int. Cl.
    *B65H 75/36*  (2006.01)

(52) U.S. Cl.
    USPC .................................. 242/388.9; 242/388.91

(58) Field of Classification Search
    USPC ......................................... 242/388.9, 388.91
    See application file for complete search history.

(56) References Cited

U.S. PATENT DOCUMENTS

| 2,922,861 | A |   | 1/1960 | White |
| 3,773,987 | A |   | 11/1973 | Davis et al. |
| 4,366,577 | A |   | 12/1982 | Brandt |
| 4,419,641 | A |   | 12/1983 | Slavin et al. |
| 5,255,768 | A |   | 10/1993 | Kasper et al. |
| 5,421,530 | A |   | 6/1995 | Bertagna et al. |
| 5,507,446 | A | * | 4/1996 | Ditzig ........................... 242/372 |
| 5,520,350 | A |   | 5/1996 | Doty et al. |
| 5,590,746 | A |   | 1/1997 | Brotz |
| 5,671,833 | A |   | 9/1997 | Edwards et al. |
| 5,746,389 | A |   | 5/1998 | Willmann |
| 6,086,007 | A |   | 7/2000 | Till |
| 6,143,985 | A |   | 11/2000 | Knapp et al. |
| 2004/0035971 | A1 |   | 2/2004 | Li |
| 2007/0023557 | A1 |   | 2/2007 | Rankin |
| 2008/0055237 | A1 |   | 3/2008 | Kim et al. |
| 2008/0156922 | A1 | * | 7/2008 | Rabinowitz et al. .......... 242/372 |
| 2011/0006146 | A1 |   | 1/2011 | Soper et al. |

* cited by examiner

*Primary Examiner* — Sang Kim
(74) *Attorney, Agent, or Firm* — Crestron Electronics Inc.

(57) ABSTRACT

A system for storing multiple cord retractors comprises at least one cord retractor. Each retractor includes a first and second pair of pulleys mounted at opposite ends of a frame. An intermediate section of a cable is stored in the frame and has one end of the stored section fixed to the frame, with the other end extending from the frame. The stored cable section is at least partially wound over the pair of pulleys, and one pair of pulleys is slidably mounted for motion toward the other pair of pulleys. A damper is coupled to one of the second pair of pulleys, which engages the pulley to rotate about an axis to damp the rotary motion of one of the second pair of pulleys in such a manner that the intermediate storage section is in tension during retraction and withdrawal. The system further includes a bracket and a pin.

20 Claims, 14 Drawing Sheets

SYSTEM FOR STORING MULTIPLE CABLE RETRACTORS

BACKGROUND OF THE INVENTION

1. Technical Field

The present invention relates to a mechanism for storing and retracting a cable. More particularly, the invention relates to a cable retractor for facilitating the withdrawal and retraction of a length of cable in such a manner that the cable remains in tension during the withdrawal and retraction.

2. Background Art

Various types of electronic instrumentation are remotely controlled or are coupled with a handset or hand-held controller by a multi-wire electric cord extending to some type of electronic box. For example, a telephone handset or a handheld microphone and control are connected by multi-wire electric cords to relatively fixed positioned electronic devices, such as a telephone body or a recorder. A hand controller or handset for an aircraft passenger entertainment system may be connected by an electric cable to an electronic control box. The handset, which is preferably stored in a position closer to the electronic control box, is movable to different locations for operation and, accordingly, it is necessary that the length of electrical cable connecting the handset with the electronic control box have a variable effective length.

Many mechanisms have been devised for facilitating variation in the effective length of a cord connected to a handset. These include wires pre-formed in a coil or spiral configuration, which may provide a shorter length of interconnecting cord, but, nevertheless, still allow a length of loose wire to extend from the handset.

A common retractor mechanism winds the cord around a drum or axle for storage and allows lengths of cord to be withdrawn by rotation of the drum. Since the cord winds around a drum. It wears out rapidly and must be replaced after a relatively short period of use. Some cord retractors operate through twisting of the cord, which causes repetitive stresses, resulting in premature breakage of the cord wires.

Accordingly, it is an object of the present invention to provide a cord retractor that avoids or minimizes the above-mentioned problems.

SUMMARY OF THE INVENTION

It is to be understood that both the general and detailed descriptions that follow are exemplary and explanatory only and are not restrictive of the invention.

DISCLOSURE OF INVENTION

Principles of the invention provide a system for storing multiple cord retractors. For example, in a first aspect of the invention, the system for storing multiple cord retractors comprises at least one cord retractor. Each cord retractor includes a first frame having first and second frame ends; and first and second laterally spaced tracks extend between and are fixed to the frame ends. The retractor further includes a second frame having first and second end portions. The first end portion is coupled to the second frame end in such a manner that the second frame is configured to pivot relative to the first frame. A first pair of pulleys is rotatable on a first axis and being disposed in the first and second laterally spaced tracks for sliding motion between the first and second frame ends. A slideable block having a bracket is coupled in-between the first pair of pulleys and at least one spring spool. The at least one spring spool is mounted at the first frame end and the slideable block is disposed in the first and second tracks. A second pair of pulleys includes a gear, which is rotatable on a second axis. The second pair of pulleys is journalled at the second frame end of the first frame. A cable has an intermediate storage section in which one end of the storage section is fixed to one of the first and second frame ends and the other end of the storage section comprises a free end that extends from the first frame through the second frame and beyond the second end portion. The cable storage section is at least partially wound over the first and second pair of pulleys. A damper is coupled to one of the second pair of pulleys, which engages one of the pulleys to rotate about the second axis to damp the rotary motion of one of the second pair of pulleys in such a manner that the intermediate storage section is in tension during retraction and withdrawal. When a tensile force acts on the free end of the cable, the first pair of pulleys with the slideable block urges toward the second pair of pulleys thereby extending the length of the cable beyond the second end portion of the second frame. The system 10 further includes an elongated support bracket having first and second slots; and a pin being inserted through the first and second slots of the support bracket and the first and second slots of each of the cable retractor.

In a second aspect of the invention, a system for storing multiple cord retractors comprises a first frame having first and second frame ends; and first and second laterally spaced tracks extend between and are fixed to the frame ends. The retractor further includes a second frame having first and second end portions. The first end portion is coupled to the second frame end in such a manner that the second frame is configured to pivot relative to the first frame. A first pair of pulleys is rotatable on a first axis and being disposed in the first and second laterally spaced tracks for sliding motion between the first and second frame ends. A slideable block having a bracket is coupled in-between the first pair of pulleys and at least one spring spool. The at least one spring spool is mounted at the first frame end and the slideable block is disposed in the first and second tracks. A second pair of pulleys includes a gear, which is rotatable on a second axis. The second pair of pulleys is journalled at the second frame end of the first frame. A cable has an intermediate storage section in which one end of the storage section is fixed to one of the first and second frame ends and the other end of the storage section comprises a free end that extends from the first frame through the second frame and beyond the second end portion. The cable storage section is at least partially wound over the first and second pair of pulleys. A damper is coupled to one of the second pair of pulleys, which engages one of the pulleys to rotate about the second axis to damp the rotary motion of one of the second pair of pulleys in such a manner that the intermediate storage section is in tension during retraction and withdrawal. Upon a tensile force acting on the free end of the cable, the first pair of pulleys with the slideable block urges toward the second pair of pulleys thereby extending the length of the cable beyond the second end portion of the second frame. The second frame comprises a latch arm pivotally mounted in the second frame with the latch arm extending beyond the second portion of the second frame. The second frame further comprises a cam member having a profile and a linkage bar having first and second ends. The first end is operably coupled to a portion of the cam member and the second end is operably coupled to a portion of the latch arm. The second frame further comprises a longitudinal back frame that is fixed to a surface of the second frame and the cable being positioned between the cam member and the longitudinal back frame. The cam member rotates to engage and disengage the cable as the latch arm pivots from a first position to a second position in such a manner that the force applied to the cable varies due to the cam profile. The cable retractor further comprises a dampening system coupled to the second pair of pulleys. The dampening system comprises a clamping plate coupled to one of the second pair of pulleys and the damper is configured to engage the gear of one of the second pair of pulleys to dampen the rotary motion of one of the pair of pulleys, which in turn, dampens the cable as the cable is being retracted by a retraction force of the at least one spring spool. The dampening system further includes a standby pulley configured to guide the cable between the first housing member and the second housing member. The system further includes an elongated support bracket having first and second slots; and a pin being inserted through the first and second slots of the elongated support bracket and the first and second slots of each of the cable retractor.

The present invention seeks to overcome or at least ameliorate one or more of several problems, including but not limited to: providing a mechanism that can store and retract a length of a cable.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

BRIEF DESCRIPTION OF THE SEVERAL VIEWS OF THE DRAWINGS

Figure 1:
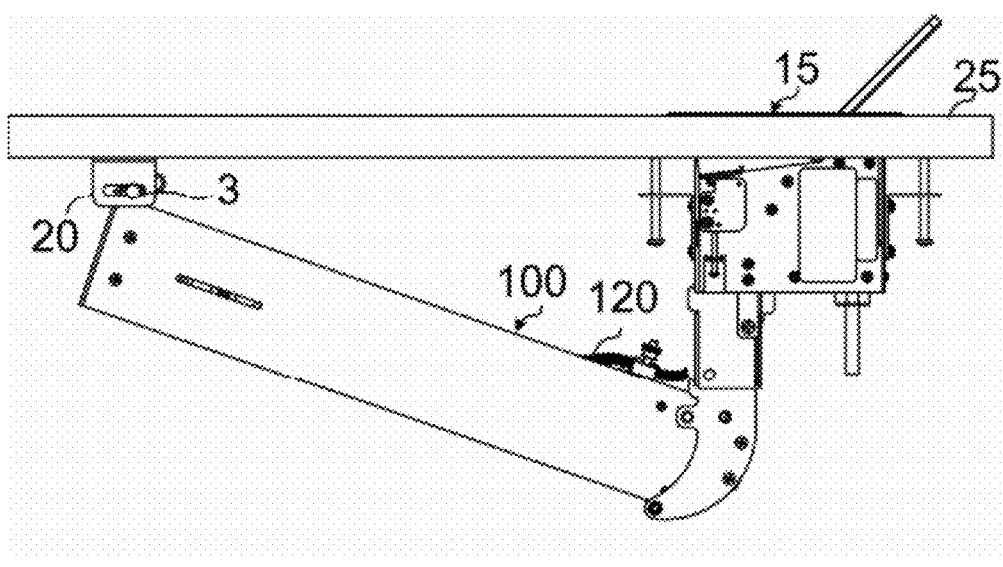

FIG. 1 is a pictorial view of a cable retractor mechanism installed in a flip panel in accordance with an illustrative embodiment of the present invention.

Figure 2:
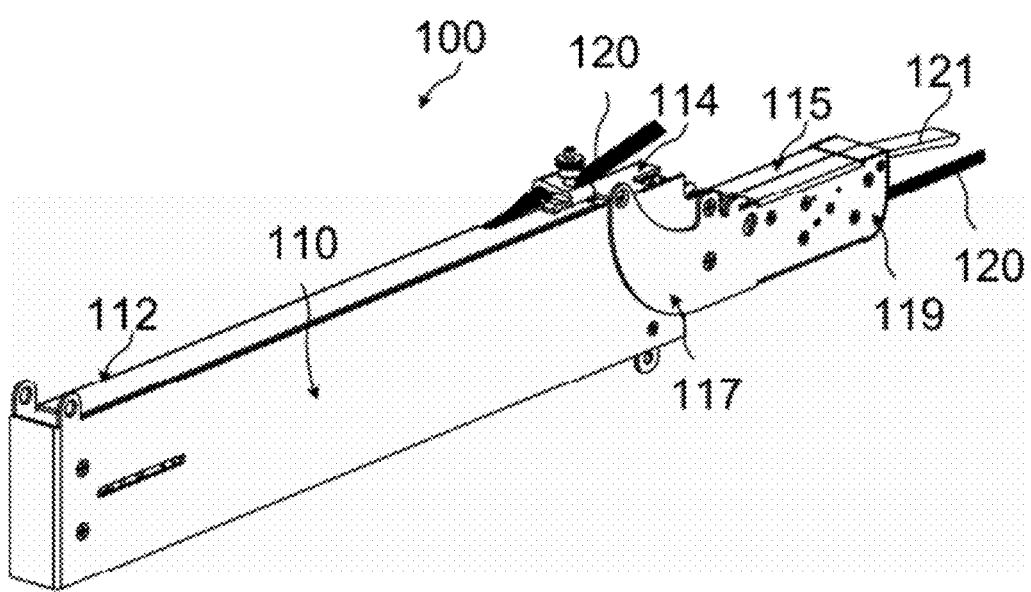

FIG. 2 is a pictorial view of a cord retractor mechanism in accordance with an illustrative embodiment of the present invention.

Figure 3:
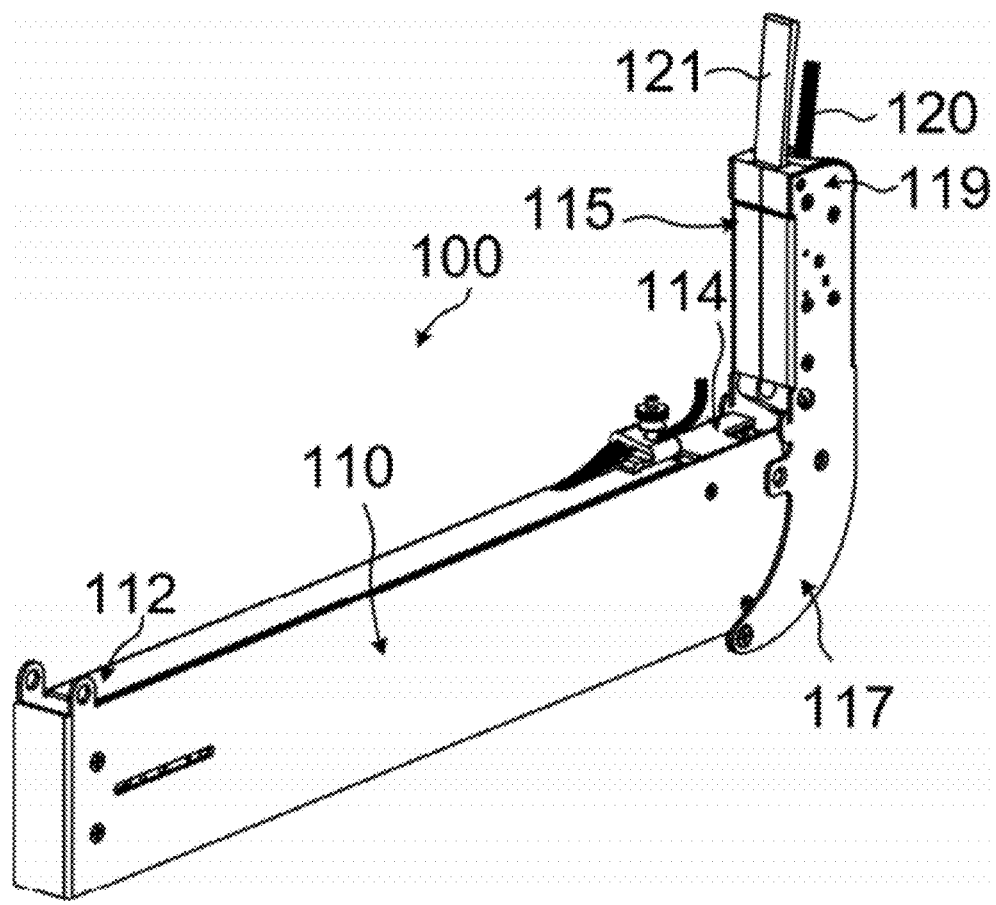

FIG. 3 is a pictorial view of a cord retractor mechanism showing a second housing of the cord retractor being bent relative to a first housing in accordance with an illustrative embodiment of the present invention.

Figure 4:
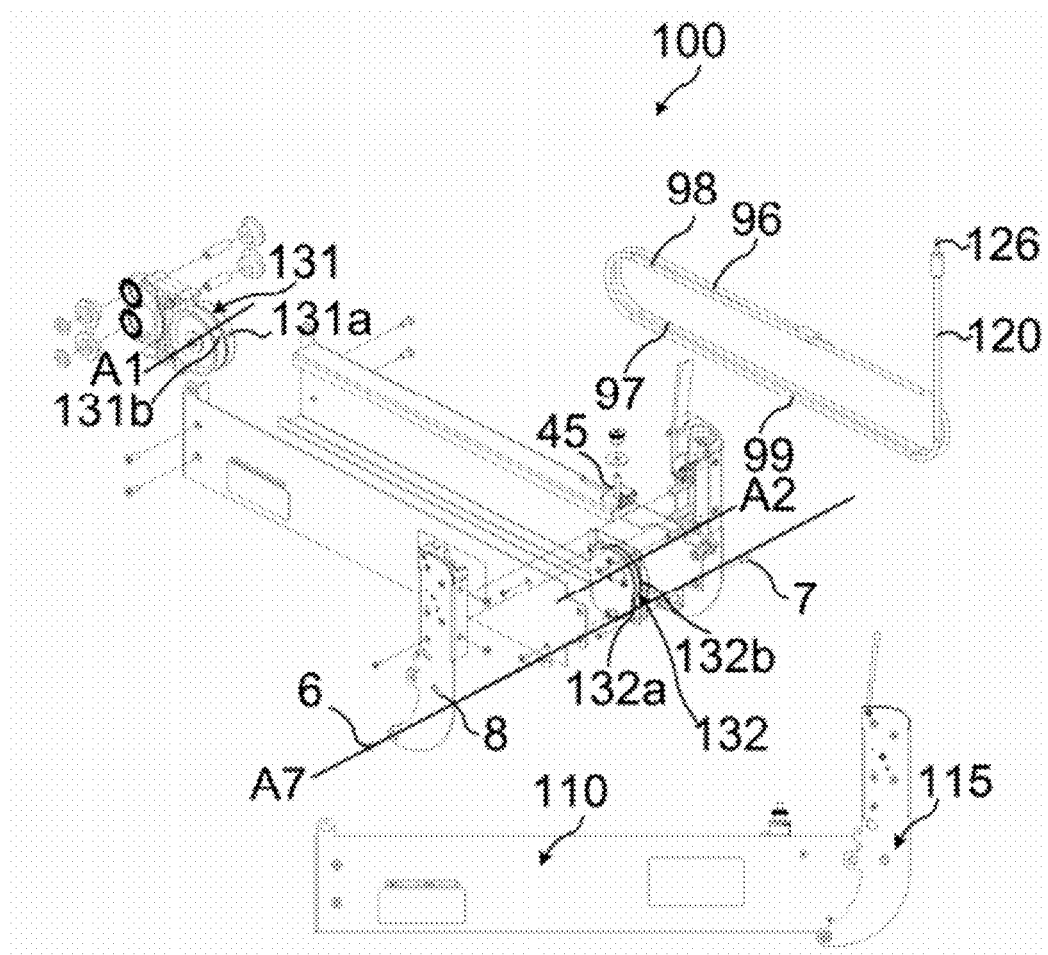

FIG. 4 is a partially exploded perspective view of the cable retractor in accordance with an illustrative embodiment of the present invention.

Figure 5:
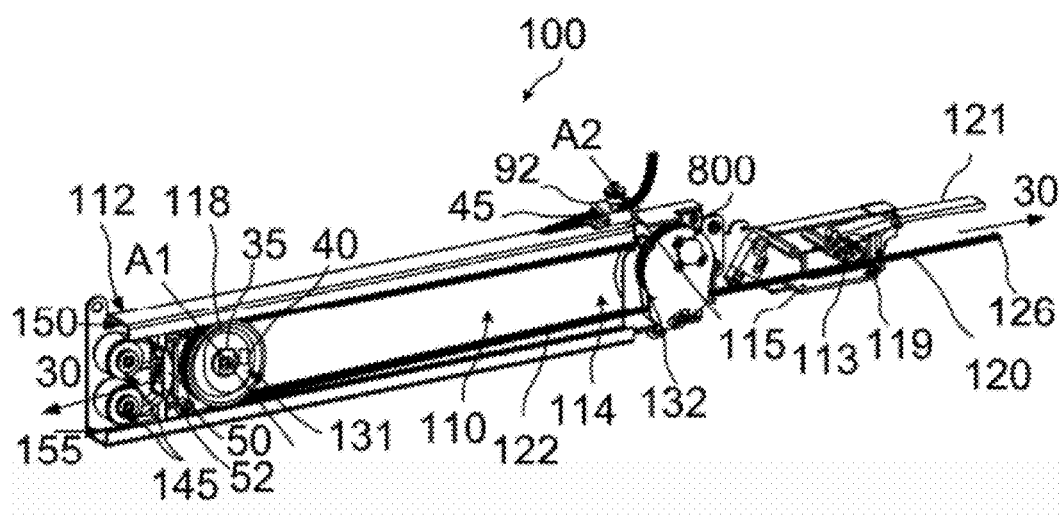

FIG. 5 is a pictorial view of a cord retractor mechanism with the top half covers removed showing the slideable pulley carriage in accordance with an illustrative embodiment of the present invention.

Figure 6:
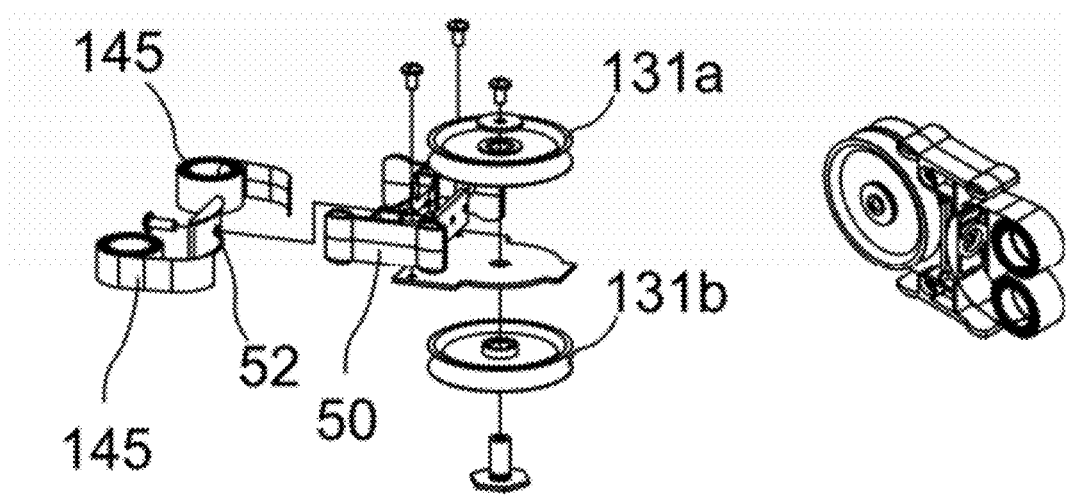

FIG. 6 is a partially exploded perspective view of a first pair of pulleys connected to at least one spring spool in accordance with an illustrative embodiment of the present invention.

Figure 7:
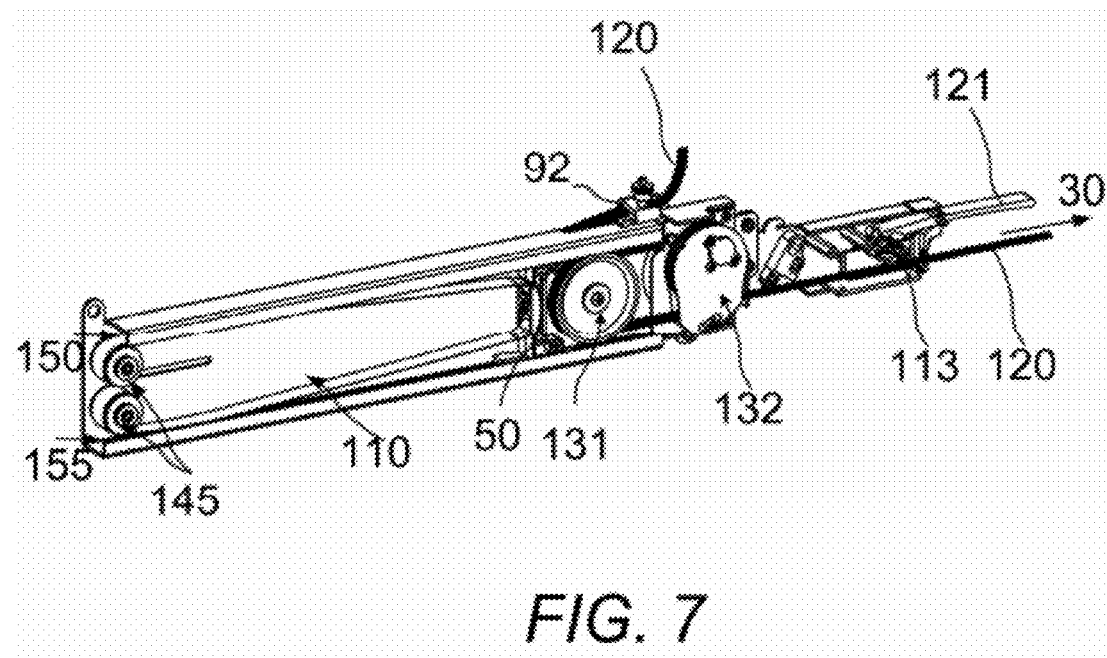

FIG. 7 is a pictorial view of a cord retractor mechanism with the top half covers removed showing the slideable pulley carriage in accordance with an illustrative embodiment of the present invention.

Figure 8:
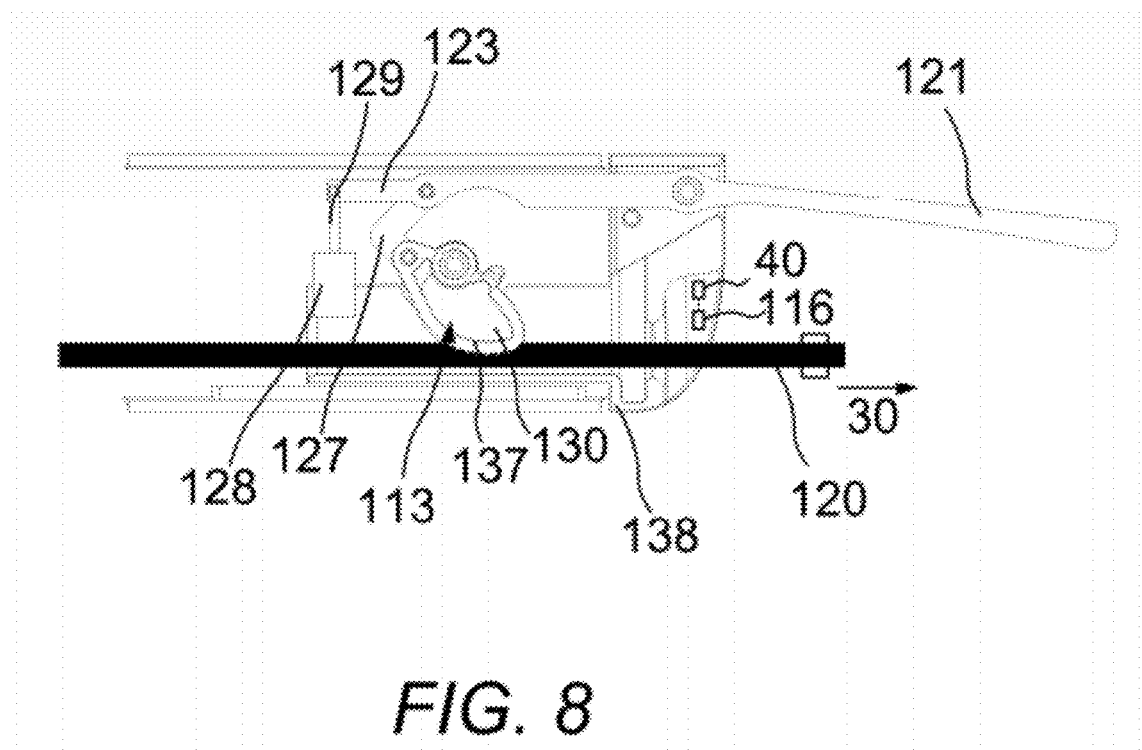

FIG. 8 is a pictorial view of the second housing of the cord retractor in a locked state in accordance with an illustrative embodiment of the present invention.

Figure 9:
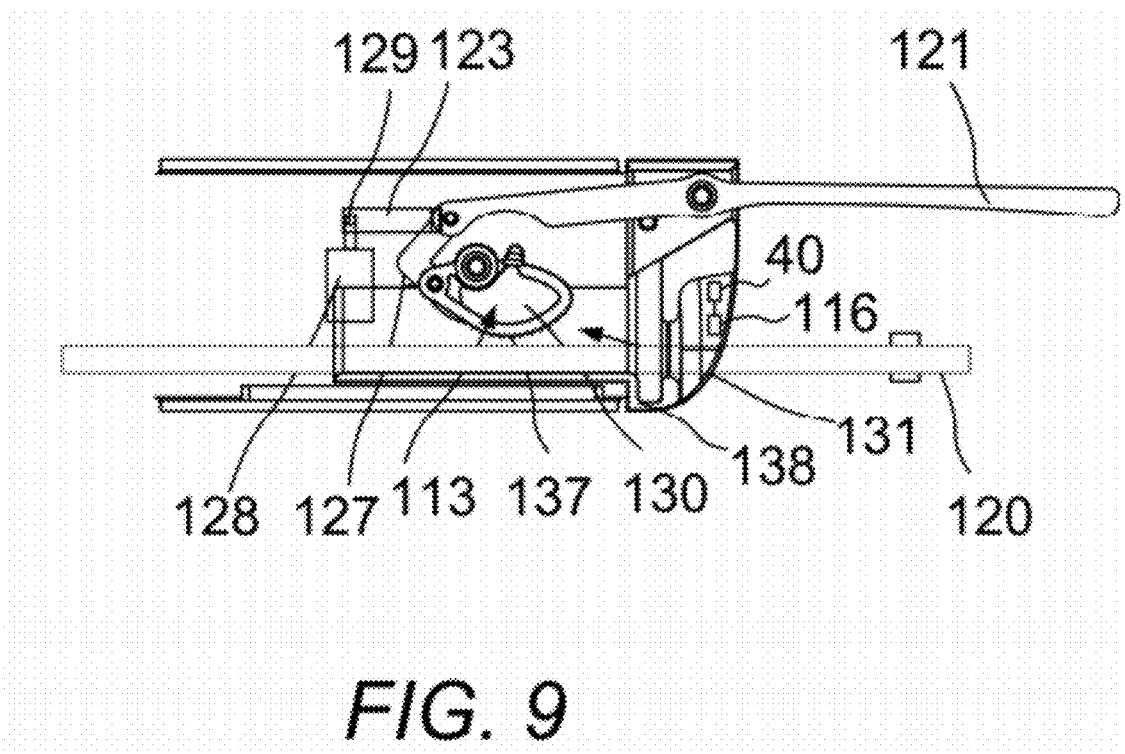

FIG. 9 is a pictorial view of the second housing of the cord retractor in an unlocked state in accordance with an illustrative embodiment of the present invention.

Figure 10:
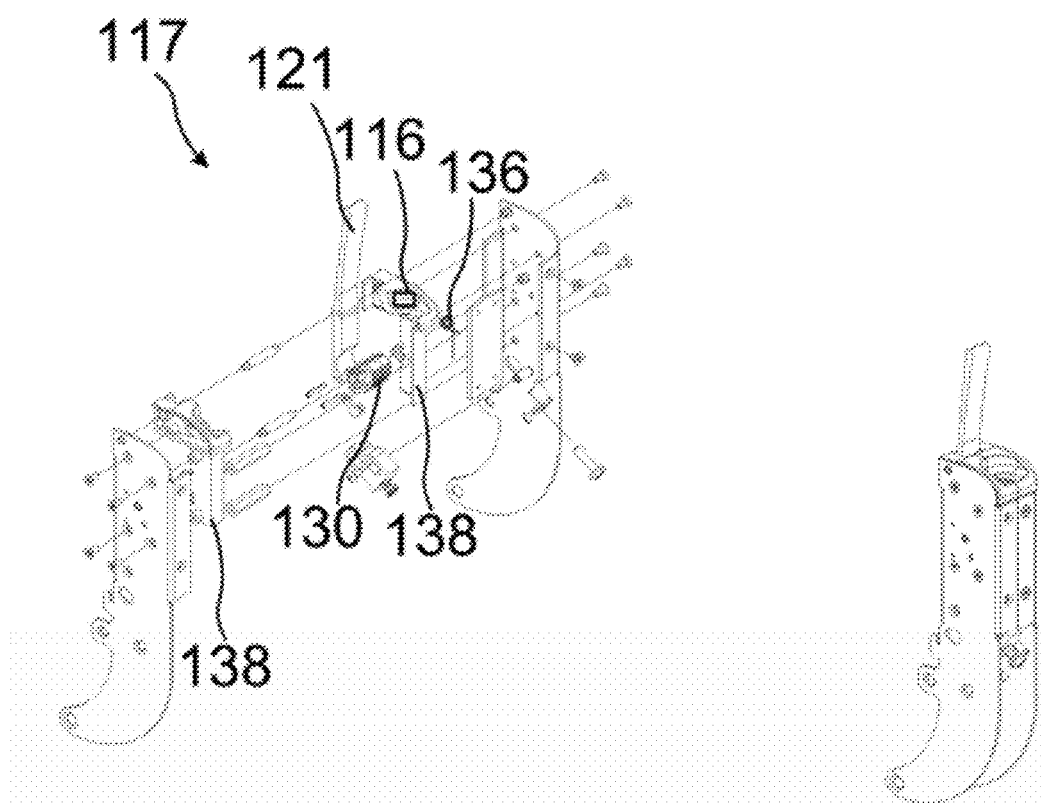

FIG. 10 is a partially exploded perspective view of the second housing in accordance with an illustrative embodiment of the present invention.

Figure 11:
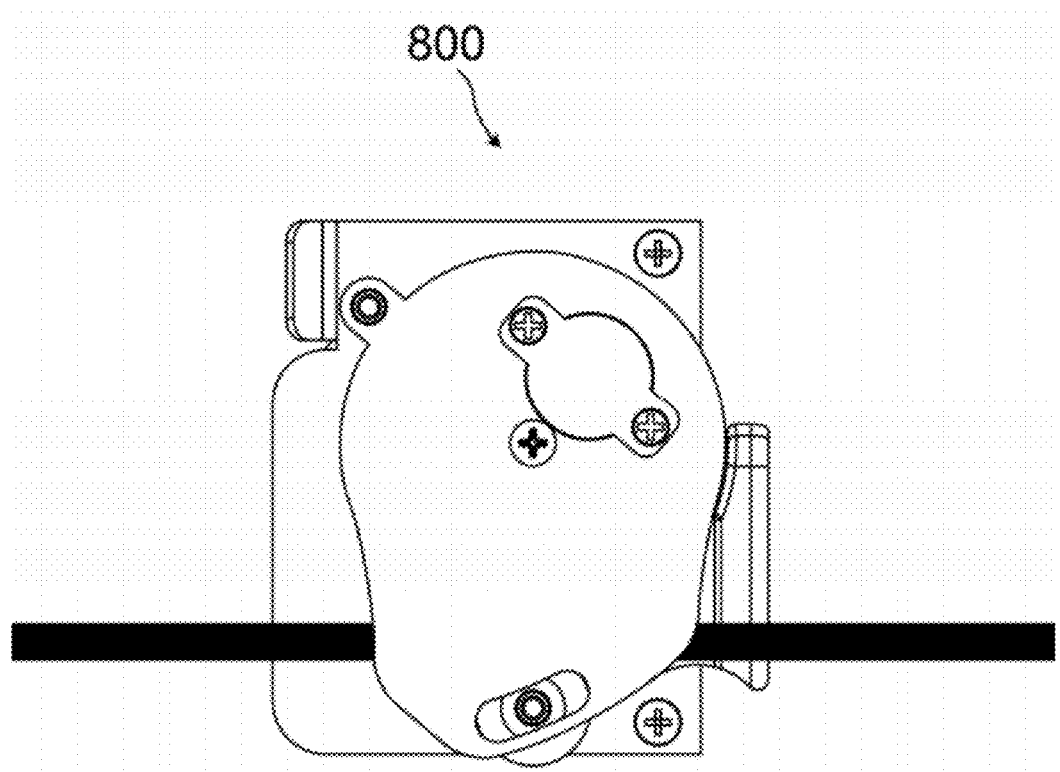

FIG. 11 is a pictorial view of a dampening system in accordance with an illustrative embodiment of the present invention.

Figure 12:
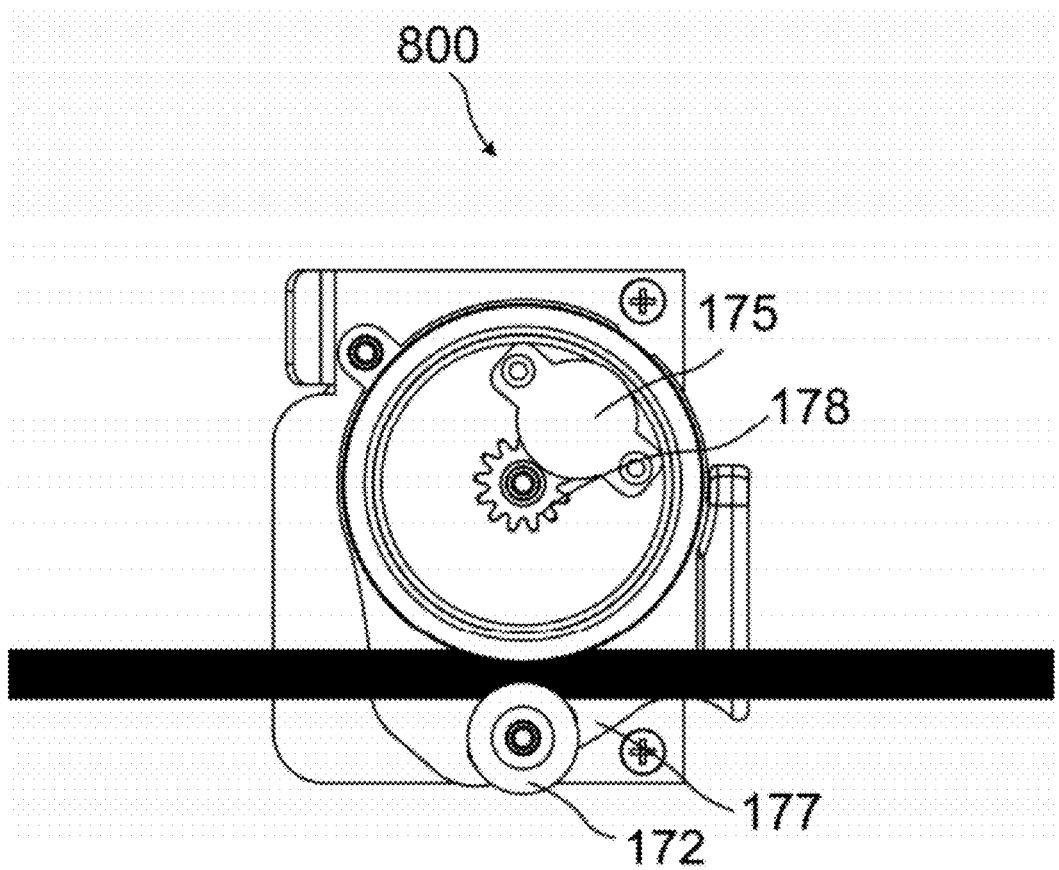

FIG. 12 is another pictorial view of the dampening system in accordance with an illustrative embodiment of the present invention.

Figure 13:
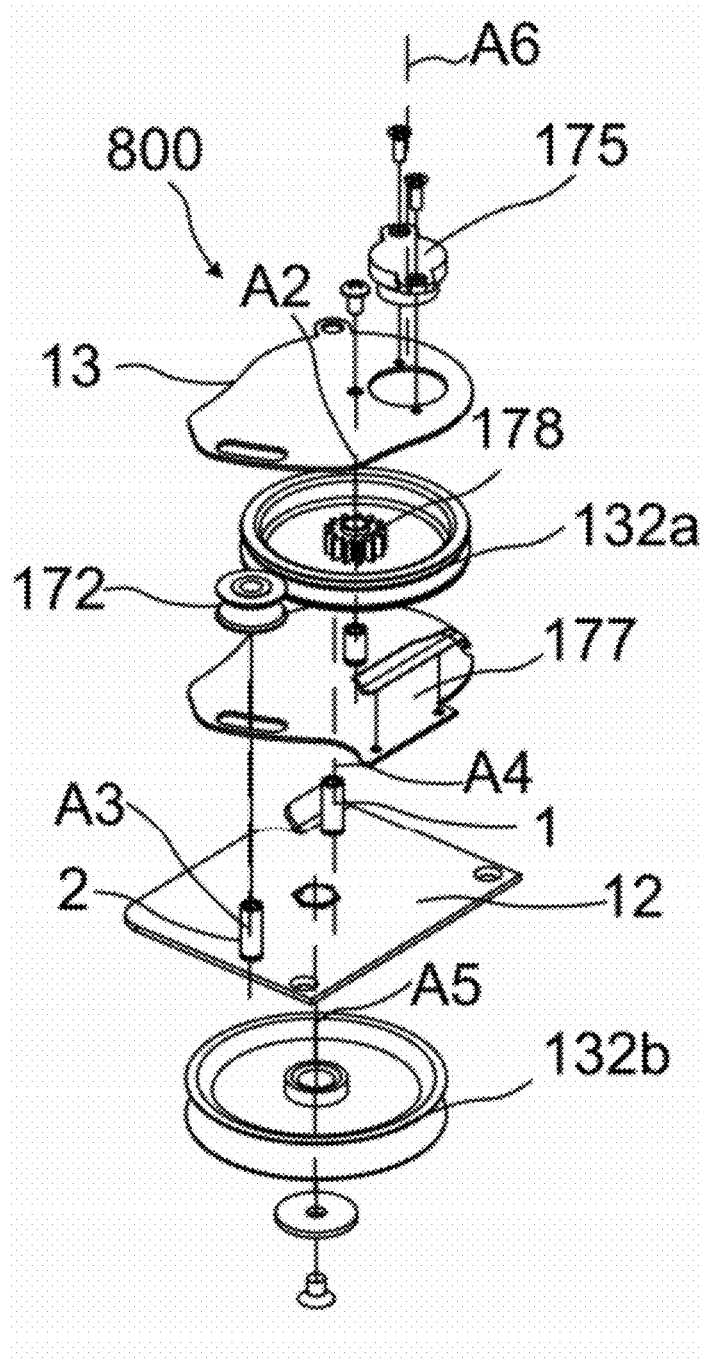

FIG. 13 is a partially exploded perspective view of the dampening system in accordance with an illustrative embodiment of the present invention.

Figure 14:
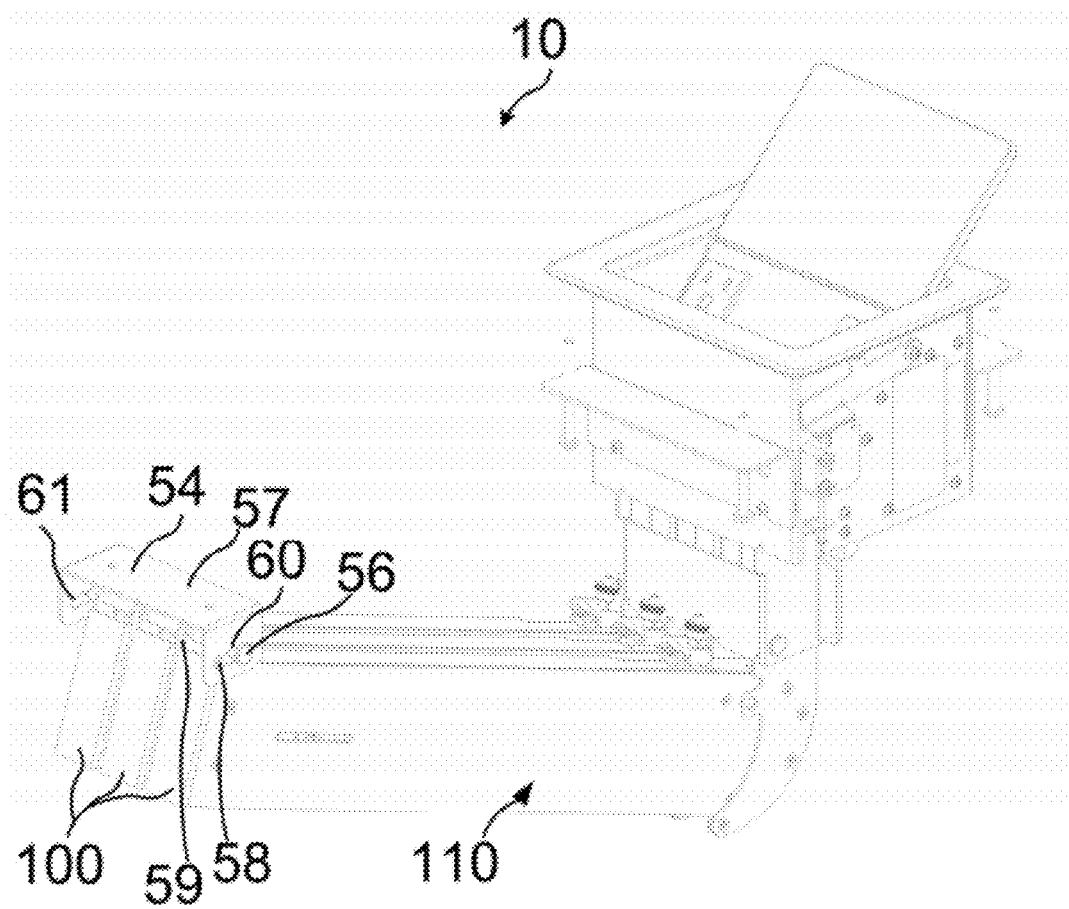

FIG. 14 is a pictorial view of a system for storing multiple cable retractors in accordance with an illustrative embodiment of the present invention.

LIST OF REFERENCE NUMBERS FOR THE MAJOR ELEMENTS IN THE DRAWING

The following is a list of the major elements in the drawings in numerical order.
A1 first axis of the first pulley
A2 second axis of one of the second pair of pulleys
A3 third axis of the standby pulley
A4 fourth axis of pin 1
A5 fifth axis of one of the second pair of pulleys
A6 sixth axis of the damper
A7 seventh axis between the first and second frame
1 pin
2 pin
3 pin
6 screw
7 screw
8 screw
9 screw
10 system to hold at least one cable cord retractor
12 base plate
13 clamping plate
15 flip top control center
20 supporting bracket
25 table
30 tensile force
32 retraction force
35 processor
40 transceiver
45 clip/clamp
50 slideable block
54 elongated support bracket
56 pin
57 flat portion of the of the bracket 54
58 first slot of each cable retractor
59 second slot of each cable retractor
60 first slot of the elongated support bracket
61 second slot of the elongated support bracket
92 fixed end of the cord
96 first leg
97 second leg
98 third leg
99 fourth leg
100 cord retractor
110 first frame
112 first frame end
113 latch recess
114 second frame end
115 second frame
116 sensor
117 first end portion of the second frame
118 encoder
119 second end portion of the second frame
120 cable 121 lever/latch arm
122 intermediate storage section of the cable
123 another linkage
124 fixed end of the cable
126 free end of the cable
127 linkage bar
128 solenoid
129 plunger/piston
130 cam member
131 first pair of pulleys
131a first pulley of first pair of pulleys
131b second pulley of first pair of pulleys
132 second pair of pulleys
132a first pulley of second pair of pulleys
132b second pulley of second pair of pulleys
136 torsion spring
137 lobe
138 longitudinal back frame
145 spring spool
150 upper track
155 lower track
172 standby pulley
175 damper
177 clamping plate
178 gear
800 dampening system

DETAILED DESCRIPTION OF THE INVENTION

Mode(s) for Carrying Out the Invention

The present invention relates to a device for managing a cable. More particularly, the invention relates to a cable retractor for facilitating the withdrawal and retraction of a length of cable in such a manner that the cable remains in tension during the withdrawal and retraction.

FIG. 1 illustrates a cable retractor 100 for facilitating the withdrawal and retraction of a length of cable 120. The cable retractor 100 is mounted to a flip top control center 15, which is flush mounted to a tabletop 25. The flip top control center 15 includes a compartment to keep interface cables at the ready to be plugged into computers, AV sources, and a host of other devices. The cable retractor 100 provides for extensive connectivity is an easy pull out cable storage mechanism to support a wide range of applications and signal types. When the cable 120 is not in use, the user end of each cable 120 stows neatly within the flip top control center 15 compartment while excess cable 120 simply drops out-of-sight below the box into the cable retractor 100.

One end of the cable retractor 100 is connected to the flip top control center 15 with double-sided adhesive tape, brackets, clips, screws, or like fasteners. The other end is connected to a support bracket 20. In one embodiment, the cable retractor 100 is mounted horizontally below the table 25. However, the cable retractor 100 also can be mounted vertically below the table 25 by releasing pin 3 that is coupled to the support bracket 20 and removing screws 6, 7 of the cable retractor 100 (FIG. 4). To install the cable retractor 100 in a horizontal manner, pin 3 is installed and screws 8, 9 (not shown) are installed instead of screws 6, 7 (FIG. 4). The cable retractor 100 may be field replaceable or retrofitted into existing conference room or more particularly, into existing flip top control center.

FIG. 2 illustrates a cable retractor 100. The cable retractor 100 has a first elongated frame 110 and a second frame 115. The first frame 110 has first and second frame ends 112, 114. The second frame 115 has first and second end portions 117, 119. The first end portion 117 of the second frame 115 is coupled to the second frame end 114 of the first frame 110 in such a manner that the second frame 115 pivots relative to the first elongated frame 110 as shown in FIG. 3. FIG. 3 illustrates the cable retractor 100 with the second frame 115 being bent from approximately 0° to 90° relative to the housing portion 110. The bending between the first and second frame ends 110, 115 at about a seventh axis A7 allows the cable retractor 100 to be mounted horizontally relative to the table 25 via the flip top control center 15 and support bracket 20.

Referring back to FIG. 2, the retractor 100 stores a length of a cable 120. The cable 120 may be a USB, Ethernet, 15-PIN VGA (plus audio combined) HDMI, DVI, CAT-5, CAT-5E, CAT-6, optical fiber, audio cable, display port or any other type of cable. The cable retractor 100 includes a lever (or angulated end portion) 121 to retract the cable 120 into the cable retractor 100.

The first and second frames 110, 115 of the present invention are made of any material that can be molded, extruded or bent, for example, metal such as aluminum, or polymers. Polymers include plastics such as thermoplastic, thermoset plastic, polyurethane, polyethylene, polypropylene and engineering plastic, for example, synthetic polymers including nylon. The materials may further be compounded with a glass fiber to maintain rigidity such that the apparatus does not warp or twist during manufacturing or installation. The material used for the first and second frames 110, 115 are easily cut, for example on a table saw or miter saw, to form various configurations such as to accommodate varying lengths. It is further contemplated that the material may be cured by a radiation source such as ultraviolet (UV) light or contain a UV additive in the material. Additionally, the material may be coated or impact modified to improve the material properties such as wear and non-slip.

FIG. 4 is a partially exploded perspective view of the cable retractor 100. The cord retractor 100 comprises at least two pair of pulleys 131, 132. The first pair of pulleys 131 includes pulley 131a and pulley 131b. The second pair of pulleys 132 includes pulley 132a and pulley 132b. Pulley 131a lies on top of pulley 131b and each pulley 131a, 131b rotates independently along a first axis A1. Pulley 132a lies on top of pulley 132b and pulley 132a rotates independently along a second axis A2. Pulley 132b rotates independently on a fourth axis A4 (FIG. 13).

A cord storage section 122 is at least partially wound over the first and second pair of pulleys 131, 132. The cord storage section 122 includes a first leg 96 extending from clip 45 to and over pulley 131a, a second leg 97 extending from pulley 131a to and over pulley 132a, a third leg 98 extending from pulley 132a to pulley 131b, a fourth leg 99 extending from pulley 131b to pulley 132b and along the longitudinal length of the second frame 115 to the free moveable end 126 of the stored cord storage section 122.

FIG. 5 illustrates the cord retractor 100 with top half covers of the elongated housing portion 110 and the second housing 115 removed. The first and second pair of pulleys 131, 132 are laterally spaced with each other with the first pair of pulleys 131 being disposed at the first frame end 112 and the second pair of pulleys 132 being disposed at the second frame end 114 of the first elongated frame 110. The first pair of pulleys 131 rotates on the first axis A1 and is disposed in the upper and lower laterally spaced tracks 150, 155 for sliding motion between the first and second frame ends 112, 114. The second pair of pulleys 132 includes a gear 178 (FIG. 13) that rotates on the second axis A2. The second pair of pulleys 132 is journalled at the second frame end 114 of the first frame 110.

The rigid elongated first housing portion 110 includes peripheral upper and lower edges to form upper and lower elongated tracks 150, 155 to receive the first pair of pulleys 131. Tracks 150, 155 have an elongated guide recess that receives a rigid rectangular (square) slide block 50 and a bracket 52. The slideable block 50 is slidably mounted in the tracks 150, 155. Tracks 150, 155 are made of or coated with a low friction material, such as Teflon or the like. Tracks 150, 155 may be formed from a single housing portion 110.

One end of the slideable block 50 is connected to the first pair of pulleys 131. The other end of the slideable block 50 is connected to at least one spring spool 145 via the bracket 52. Referring to FIGS. 5-6, the spring spool 145 is disposed between the tracks 150, 155. The spring spool 145 (in a normal or relaxed state) exerts a near continuous retraction force to pull the slideable block 50 along with the first pair of pulleys 131 away from the second pair of pulleys 132. The retraction force F1 urges the slideable block 50 away from the second pair of pulleys 132 to a cord storage or retracted position. The cord 120 with an intermediate storage section 122 is stored in the cord retractor 100. One end of the storage section 122 is fixed to one of the first and second frame ends 112, 114. In one embodiment, the one end of the storage section 122 is fixed onto a clip 45 or other type of mechanical mechanism. The other end of the storage section 122 comprises a free end 126, which extends from the first frame 110 through the second frame 115 and beyond the second end portion 119.

The cord retractor includes a dampening system 800. The dampening system 800 prevents the cord 120 from whipping during retraction as will be further explained with references to FIGS. 11-13.

The cord retractor 100 may include a rotary/shaft encoder 118 to provide a value of the length of the pulled cord 120. The rotary/shaft encoder 118 is connected to at least one of the first and second pair of pulleys 131, 132. For example, in one embodiment, the encoder 118 is connected to pulley 131a. In another embodiment, the encoder 118 is connected to pulleys 132a, 132b. The rotary encoder 118 converts the angular position of a shaft to an analog or digital code, making it an angle transducer. The rotary encoder 118 may be connected to a transceiver 40. The transceiver 40 may be connected electrically to a processor 35 to send a signal (wired or wirelessly) to a display unit (not shown) to display a length of the withdrawn cord 120. It should be understood that the rotary encoder may be connected to the other pulley.

When a user wants to extend a length of the cord 120, the user would pull on a free end of the cord 120 (e.g., tensile force 30). As a result of the pull, the first pulley 131 along with the slideable block 50 is longitudinally moved along the tracks 150, 155 toward the second pulley 132. In one embodiment, the force (e.g., tensile force 30) put on the cord 120 by the user is greater than one-fourth of the retraction force (e.g., 32) of the spring spool 145. The second pulley 132 is stationary and fixed to the housing portion 110. In other words, the second pulley 132 is not slideable.

The cord or cable 120 includes a fixed end 92 clamped to the housing 110 or frame by a clip or clamp 45 and extending longitudinally from the cord retractor 100 to an electronic control box or device (not shown). The storage or stored section of cord 122 is at least partially wound over the pulleys 131, 132.

Pulling on the free end 126 of the stored cord 120 exerts a pull (e.g., tensile force 30) on the movable pulley 131 and draws the slideable block 50 and the cord pulley 131 along the tracks 150, 155 away from spring spool 145 and toward the fixed pulleys 132. This motion of the slideable block 50 and longitudinally shiftable pulley 131 is resisted by continued elongation of the spring spool 145, which has movable ends fixed to the slideable block 50, which extend from the spring spool 145 during withdrawal of the cord 120 and then revert back to the spring spool 145 during retraction of the cord 120.

As the free end 106 of the cord 120 is withdrawn, the first pulley 131 with the slideable block 50 moves to a position as shown in FIG. 7. A resilient spring latch arm 121 is disposed within the second frame 115 of the cord retractor 100. The latch arm 121 is connected to a latch recess 113, which is more particularly illustrated in FIGS. 8-10.

Referring to FIGS. 8-10, the latch recess 113 includes a locking shaped cam member 130 having a lobe 137. The cam member 130 projects laterally outwardly in the latch recess 113. The latch recess 113 also includes a linkage bar 127 that connects between the cam member 130 and the latch arm 121.

The latch recess 113 further includes a solenoid 128. Solenoids are actuators capable of linear motion. Solenoids can be electromechanical, hydraulic, or pneumatic driven. When energy is applied to the solenoid, the solenoid produces a linear force. The solenoid 128 includes a plunger or piston 129. The plunger or piston 129 is connected to the latch arm 121 via another linkage 123. The solenoid 128 may be a linear miniature solenoid. The solenoid may be a push or a pull type tubular design. In the pull type design, the plunger is pulled into the solenoid coil when the coil is energized. In push type solenoids, the plunger is also pulled into the solenoid coil. However, the plunger has a shaft extension which then pushes out through a hole in the end of the solenoid case. The tubular design typically offers the most compact package size to force ratio and very long life. The solenoid may be a pulled type solenoid STA ½"×1" with a package dimension of 0.52" diameter and 1.05" length. The maximum and nominal strokes are 0.50" and 0.10", respectively. The force at nominal stroke ranges from 0.13 lbs. to 10 lbs.

The latch recess 113 includes a torsion spring 136 (FIG. 10). The torsion spring 136 is located on one side of the cam member 130. The latch recess 113 further includes a longitudinal back frame 138 that is fixed to a surface of the second frame 115. The torsion spring 136 maintains the cam member 130 to make physical contact with cable 120, which in turn, makes contact with the longitudinal back frame 138. The profile of the cam member 130 prevents the cord 120 from retracting, thus the cable 120 is in a locked position. This stops further motion of the slideable block 50 toward the second pair of pulleys 132.

The cable cord retractor 100 further includes a sensor 116 to sense whether the cord 120 has been fully retracted. The sensor 116 may be connected at the second end portion 119 of the second frame 117. The sensor 116 is connected to an indicator (not shown). The indicator may be an audible sound or an LED. The cord 120 has a connector portion, which makes contact with the sensor 116. In response to the contact, the sensor 116 activates the indicator. In another embodiment, the sensor 120 may further be connected to a transceiver 40. The transceiver 40 sends a signal to, for example, a display panel to display a message that the cord 120 is fully retracted (i.e., storage state).

When the user pulls the cord 120 at the free end 106 by applying a tensile force 30, thereby removing a length of the cord 120 from the cord retractor 100, the torsion spring 136 still pushes against the cam member 130 as shown specifically in FIG. 8. However, the cam member 130 rotates to a different cam profile due to the force that is being applied by the user pulling on the cord 120. More specifically, the lobe 137 on the cam member 130 is in a different location and as a result lobe 137 makes less contact with the cable 120. Therefore, there is no gap 131 between the cam member 130 and the cord 120. The cord 120 is able to extend out of the cord retractor 100 until the user stops pulling on the cord 120. When the user stops pulling on the cord 120, the cord 120 remains in the locked position as described above with referenced to FIG. 8.

When the cord 120 is in an extended position (or not in storage), there are two ways to retract the cord 120. The spring spool 145 that is in normal tension would pull or retract the cord 120 into a storage state. However, when the cord is in a locked state as described with reference to FIG. 8, there are at least two ways of unlocking (or retracting) the cord 120. One way is for the user to actuate the spring latch arm (or lever) 121 as shown specifically in FIG. 9. When the lever 121 is activated, cam member 130 rotates to a different cam profile as discussed above via the linkage bar 127. The cord 120 is then retracted due to the retraction force exerted by the spring spool 145.

Another way to unlock (or retract) the cord 120 is by activating a button or switch (not shown) that is electrically connected to the solenoid 128. In response to the pressing or activation of the button, a voltage is applied to the solenoid coil, which causes the plunger 129 to pull into the solenoid coil. As the plunger 129 pulls into the solenoid coil, the cam member 130 rotates to a different cam profile as discussed above via the linkage bar 127. The cord 120 is then retracted due to the retraction force 32 exerted by the spring spool 145. The user continues to press the button until the cord 120 retracts to a user desired length. The user desired length may be when the cord 120 is fully retracted into the cable retractor 100. In another embodiment, if the user quickly presses the button once, the cord will fully retract without the user needing to continuously press the button.

The button or switch to activate the solenoid may be located locally near the cord retractor 100 via a cable or the button may be located remotely. If the button is located remotely, the button can communicate wirelessly to activate the solenoid 128 via a network. For example, network equipment to enable wireless communication may include an Ethernet switch (not shown) that is connected to a wireless gateway (not shown). The wireless gateway may be a wireless Wi-Fi gateway and/or a wireless Zigbee gateway. The wireless Wi-Fi gateway or wireless Zigbee gateway may be combined into a single wireless gateway device 165. Further, a transceiver 40 may be connected to the solenoid 128 and or button to enable wireless communication.

FIGS. 11-13 are pictorial and exploded views of the dampening system 800 that is disposed in the housing 110. The dampening system 800 prevents the cord 120 from whipping during retraction. The dampening system 800 includes a damper 175, clamping plate 13, gear 178, pulley 132a, standby pulley 172, another clamping plate 177, base plate 12, and pulley 132b. Base plate 12 includes at least two pins 1, 2. One of the pins 1, 2 is coupled to a pulley to make it the standby pulley 172. The standby pulley 172 guides the cable 120 into the second housing 115 and rotates about a third axis A3.

The damper 175 is inserted through an opening of the clamping plate 13 and rotates about a sixth axis A6. The damper 175 is operatively connected to the gear 178 that is formed onto the pulley 132a to damp the rotary motion of pulley 132a when the cable 120 is retracted by the force of the spring spool 145. The pulley 132a with the gear 178 rotates about a second axis A2. The damper 175, clamping plates 13, 177, and pulley 132a with the gear 178 pivot about a fourth axis of pin 1 of the base plate 12. The second pulley 132b rotates independently about a fifth axis A5.

The damper 175 may be an oil-type rotary or linear damper in which the viscosity of oil contained within the body of the damper 175 provides resistance to the rotation of pulley 132a. Other types of dampers and rotary dampers can be utilized, for instance, dampers that utilizes gears or frictionally engaging parts to provide a damping function. The damper 175 is coupled to one of the second pair of pulleys 132, which rotates about axis A2 in such a manner that the intermediate storage section 122 is in tension during retraction and withdrawal.

The dampening system 800 dampens the cord 120 so there is tension on the cord 120 as the cord 120 retracts and withdraws. Other dampeners dampen a spring during retraction, and not the cord. To this end, the cord is not in tension during retraction and withdrawal. The loose cord may rub against various parts of the cord retractor, which will cause excessive wear and abrasion on the cord.

The cable cord retractor 100 stores and allows withdrawal of approximately 41 inches of cord. Of course, the number of pulleys or overall length in each set, that is, at each end of the mechanism, may be varied to change the total length of stored cord. Thus, each end of the mechanism may have a single pulley or may have two or more pulleys if it is desired to increase the amount of cord storage.

FIG. 14 illustrates an embodiment of a system 10 for storing multiple cord retractors 100. The system 10 includes at least one cord retractor 100 and each cord retractor 100 is coupled alongside each other by an elongated support bracket 54 and a pin 56. The pin 56 firmly holds the cord retractors 100 together. The elongated support bracket 54 has first and second slots 60, 61. The pin 56 is inserted through the first and second slots 60, 61 of the bracket 54 in addition to the first and second slots 58, 59 of each of the cord retractor 100. Bracket 54 is sized and dimensioned in such a manner that the bracket 54 can rotate and translate when pin 56 is inserted through slots 58, 59, 60, 61.

A flat portion 57 of the bracket 54 is mounted horizontally below the table 25 (FIG. 1) via screws (not shown). The system 10 can also be mounted vertically below the table 25 by releasing pin 56 that is coupled to support bracket 54 and removing screws 6, 7 of the cable retractor 100 (FIG. 4). To install the cable retractor 100 in a horizontal manner, pin 56 is installed and screws 8, 9 (not shown) are installed instead of screws 6, 7 (FIG. 4).

INDUSTRIAL APPLICABILITY

To solve the aforementioned problems, the present invention is a unique system for storing multiple cord retractors.

LIST OF ACRONYMS USED IN THE DETAILED DESCRIPTION OF THE INVENTION

The following is a list of the acronyms used in the specification in alphabetical order.
CAT-5 Category 5 cable
CAT-5E Category 5E cable
CAT-6 Category 6 cable
DVI Digital Visual Interface
HDMI High-Definition Multimedia Interface
LED Light-Emitting Diode
USB Universal Serial Bus
VGA Video Graphics Array

ALTERNATE EMBODIMENTS

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A system (10) for storing multiple cord retractors, comprising:
   (a) at least one cord retractor (100), each cord retractor, comprises,
      (i) a first frame (110) having first and second frame ends (112, 114) and first and second laterally spaced tracks (150, 155) extend between and are fixed to the frame ends, and wherein the first frame end includes first and second slots (58, 59),
      (ii) a second frame (115) having first and second end portions (117, 119), wherein the first end portion is coupled to the second frame end in such a manner that the second frame is configured to pivot relative to the first frame,
      (iii) a first pair of pulleys (131) rotatable on a first axis (A1) and being disposed in the first and second laterally spaced tracks for sliding motion between the first and second frame ends,
      (iv) a slideable block (50) having a bracket (52) coupled in-between the first pair of pulleys and at least one spring spool (145), wherein the at least one spring spool is mounted at the first frame end and the slideable block is disposed in the first and second tracks,
      (v) a second pair of pulleys (132) having a gear (178), wherein one of the second pair of pulleys is rotatable on a second axis (A2), and wherein the second pair of pulleys is journalled at the second frame end of the first frame,
      (vi) a cable (120) having an intermediate storage section (122), wherein one end of the storage section (122) is fixed to one of the first and second frame ends and the other end of the storage section comprising a free end (126) extending from the first frame through the second frame and beyond the second end portion, the cable storage section being at least partially wound over the first and second pair of pulleys, and
      (vii) a damper (175) coupled to one of the second pair of pulleys, which engages one of the second pair of pulleys to rotate about the second axis to damp the rotary motion of one of the second pair of pulleys in such a manner that the intermediate storage section is in tension during retraction and withdrawal,
      (viii) wherein upon a tensile force (30) acting on the free end of the cable, the first pair of pulleys with the slideable block urges toward the second pair of pulleys thereby extending the length of the cable beyond the second end portion of the second frame
   (b) an elongated support bracket (54) having first and second slots (60, 61); and
   (c) a pin (56) being inserted through the first and second slots of the support bracket and the first and second slots of each of the cable retractor.

2. The system of claim 1, wherein the cable is at least one of a USB, Ethernet, 15-PIN VGA, HDMI, DVI, CAT-5, CAT-5E, CAT-6, optical fiber, audio cable, and display port cable.

3. The system of claim 1, wherein the laterally spaced tracks or slideable block are coated with a low friction material.

4. The system of claim 1, wherein the at least one spring spool exerts a near continuous retraction force to pull the block along with the slideable first pair of pulleys away from the second pair of pulleys.

5. The system of claim 1, further comprising a rotary encoder (118) coupled to at least one of the first pair of pulleys for detecting the revolution of at least one of the first pair of pulleys to determine the length of the free end of the cable extending from the second portion of the second frame.

6. The system of claim 5, further comprising a transceiver (40) coupled to the rotary encoder to transmit data including the length of the free end of the cable extending from the second portion of the second frame.

7. The system of claim 1, wherein the second frame comprises:
   (a) a latch arm (121) pivotally mounted in the second frame with the latch arm extending beyond the second portion of the second frame;
   (b) a cam member (130) having a cam profile;
   (c) a linkage bar (127) having first and second ends, the first end being operably coupled to a portion of the cam member and the second end being operably coupled to a portion of the latch arm; and
   (d) a longitudinal back frame (138) being fixed to a surface of the second frame, the cable being positioned between the cam member and the longitudinal back frame,
      wherein the cam member rotates to engage and disengage the cable as the latch arm pivots from a first position to a second position in such a manner that the force applied to the cable varies due to the cam profile.

8. The system of claim 7, further comprising at least one spring (136) coupled to the cam member to bias the cam member toward the engaged position, the engaged position prevents the cable from retracting into the cord retractor.

9. The system of claim 7, further comprising a solenoid (128) operable coupled to the latch arm via another linkage (123), wherein the solenoid is operable to cause the cam member to engage and disengage the cable in response to an actuation of the solenoid.

10. The system of claim 7, wherein the solenoid further comprises a processor (35) coupled to a transceiver (40) to actuate the solenoid wirelessly.

11. The system of claim 1, further comprising a dampening system coupled to one of the second pair of pulleys, the dampening system comprises:
   (a) a clamping plate (177) coupled to one of the second pair of pulleys;
   (b) the damper configured to engage the gear of one of the second pair of pulleys to dampen the rotary motion of one of the second pair of pulleys, which in turn, dampens the cable as the cable is being retracted by a retraction force of the at least one spring spool; and
   (c) a standby pulley (172) configured to guide the cable between the first housing member and the second housing member.

12. A system (10) for storing multiple cord retractors, comprising:
   (a) a first frame (110) having first and second frame ends (112, 114) and first and second laterally spaced tracks (150, 155) extending between and fixed to the frame ends
   (b) a second frame (115) having first and second end portions (117, 119), the first end portion is coupled to the second frame end in such a manner that the second frame is configured to pivot relative to the first frame, (c) a first pair of pulleys (131) rotatable on a first axis (A1) and being disposed in the first and second laterally spaced tracks for sliding motion between the first and second frame ends, (d) a slideable block (50) having a bracket (52) coupled in-between the first pair of pulleys and at least one spring spool (145), the at least one spring spool is mounted at the first frame end and the slideable block is disposed in the first and second tracks, (e) a second pair of pulleys (132) having a gear (178), wherein one of the second pair of pulleys is rotatable on a second axis (A2), and wherein the second pair of pulleys is journalled at the second frame end of the first frame, (f) a cable (120) having an intermediate storage section (122), one end of the storage section being fixed to one of the first and second frame ends and the other end of the storage section comprising a free end (126) extending from the first frame through the second frame and beyond the second end portion, the cable storage section being at least partially wound over the first and second pair of pulleys, (g) a damper (175) coupled to one of the second pair of pulleys, which engages one of the second pair of pulleys to rotate about the second axis to damp the rotary motion of one of the second pair of pulleys in such a manner that the intermediate storage section is in tension during retraction and withdrawal, (h) wherein upon a tensile force (30) acting on the free end of the cable, the first pair of pulleys with the slideable block urges toward the second pair of pulleys thereby extending the length of the cable beyond the second end portion of the second frame, (i) wherein the second frame comprises:
  (i) a latch arm (121) pivotally mounted in the second frame with the latch arm extending beyond the second portion of the second frame,
  (ii) a cam member (130) having a profile,
  (iii) a linkage bar (127) having first and second ends, the first end being operably coupled to a portion of the cam member (130) and the second end being operably coupled to a portion of the latch arm, and
  (iv) a longitudinal back frame (138) that is fixed to a surface of the second frame, the cable being positioned between the cam member and the longitudinal back frame,
  (v) wherein the cam member rotates to engage and disengage the cable as the latch arm pivots from a first position to a second position in such a manner that the force applied to the cable varies due to the cam profile, (j) a dampening system coupled to one of the second pair of pulleys, the dampening system comprising:
  (i) a clamping plate (177) coupled to one of the second pair of pulleys,
  (ii) the damper configured to engage the gear of one of the second pair of pulleys to dampen the rotary motion of one of the second pair of pulleys, which in turn, dampens the cable as the cable is being retracted by a retraction force of the at least one spring spool, and
  (iii) a standby pulley (172) configured to guide the cable between the first housing member and the second housing member;

(c) an elongated support bracket (54) having first and second slots (60, 61); and (d) a pin (56) being inserted through the first and second slots of the elongated support bracket and the first and second slots of each of the cable retractor.

13. The cord retractor of claim 12, wherein the cable is at least one of a USB, Ethernet, 15-PIN VGA, HDMI, DVI, CAT-5, CAT-5E, CAT-6, optical fiber, audio cable, and display port cable.

14. The cord retractor of claim 12, wherein the laterally spaced tracks or slideable block are coated with a low friction material.

15. The cord retractor of claim 12, wherein the at least one spring spool (145) exerts the near continuous retraction force to pull the slideable block along with the first pair of pulleys away from the second pair of pulleys.

16. The cord retractor of claim 12, further comprising a rotary encoder (118) coupled to at least one of the first pair of pulleys for detecting the revolution of the at least one of the first pair of pulleys to determine the length of the free end of the cable extending from the second portion of the second frame.

17. The cord retractor of claim 16, further comprising a transceiver (40) coupled to the rotary encoder to transmit data including the length of the free end of the cable extending from the second portion of the second frame.

18. The cord retractor of claim 12, further comprising at least one spring (136) coupled to the cam member to bias the cam member towards the engaged position, the engaged position prevents the cable from retracting into the cord retractor.

19. The cord retractor of claim 12, further comprising a solenoid (128) operable coupled to the latch arm via another linkage (123), wherein the solenoid is operable to cause the lobe portion of the cam member to engage and disengage the cable in response to an actuation of the solenoid.

20. The cord retractor of claim 19, wherein the solenoid further comprises a processor (35) coupled to a transceiver (40) to actuate the solenoid wirelessly.

\* \* \* \* \*